United States Patent [19]

Grantham

[11] Patent Number: 4,917,149

[45] Date of Patent: Apr. 17, 1990

[54] BREAKAWAY COUPLING, CONDUIT SYSTEM UTILIZING THE COUPLING AND METHODS OF MAKING THE SAME

[75] Inventor: Rodger P. Grantham, Springfield, Mo.

[73] Assignee: Dayco Products, Inc., Dayton, Ohio

[21] Appl. No.: 417,381

[22] Filed: Oct. 5, 1989

Related U.S. Application Data

[63] Continuation of Ser. No. 181,296, Apr. 14, 1988, abandoned.

[51] Int. Cl.⁴ .............................................. F10L 29/00
[52] U.S. Cl. ...................................... 137/614.03
[58] Field of Search ................................ 137/614.03

[56] References Cited

U.S. PATENT DOCUMENTS

| | | | |
|---|---|---|---|
| 2,511,765 | 6/1950 | Bradbury | 137/614.03 X |
| 2,545,796 | 3/1951 | Scheiwer | 137/614.03 X |
| 2,821,412 | 1/1958 | Frye | 137/614.03 |
| 2,854,259 | 9/1958 | Clark | 137/614.03 |
| 3,097,867 | 7/1963 | Saloum | 137/614.03 X |
| 3,205,911 | 9/1965 | Swick, Jr. | 137/614.03 |
| 3,285,283 | 11/1966 | Calvin | 137/614.03 |
| 3,446,245 | 5/1969 | Snyder, Jr. | 137/614.03 |
| 3,500,860 | 3/1970 | Prosl, Jr. et al. | 137/614.03 |
| 4,429,713 | 2/1984 | Walter | 137/614.03 |

FOREIGN PATENT DOCUMENTS

616242  3/1961  Canada ........................... 137/614.03

*Primary Examiner*—John Fox
*Attorney, Agent, or Firm*—Joseph V. Tassone

[57] ABSTRACT

A breakaway coupling, a conduit system utilizing the coupling and methods of making the same are provided, the breakaway coupling being adapted to be incorporated into a conduit system and comprising a pair of tubular coupling members each having opposed ends one of which is adapted to be interconnected to a part of the conduit system and the other of which is held in sealing and coupling engagement with the other end of the other coupling member until uncoupled therefrom by a certain axial force being created therebetween, each of the coupling members having a fixed valve seat and a movable valve member for opening and closing its respective valve seat whereby the valve seats of the coupling members must both be open before a fluid flow can pass through the coupling members, each of the coupling members having a spring operatively associated with its respective valve member to tend to move that valve member to its closed position, each of the coupling members having an abutment for engaging the valve member of the other coupling member and moving the same to its open position in opposition to its respective spring as the coupling members are being disposed in their coupling engagement, the fixed valve seat of one of the coupling members comprising a cup-shaped member having a closed end interconnected by a sidewall to an open end disposed in fluid communication with the one opposed end of that one coupling member, the sidewall having an opening therethrough, the valve member of the one coupling member comprising an annular slide member telescopically receiving the cup-shaped member therein so as to slide on the sidewall thereof and tend to be urged to a position thereon by its spring to close the opening thereof.

20 Claims, 4 Drawing Sheets

BREAKAWAY COUPLING, CONDUIT SYSTEM UTILIZING THE COUPLING AND METHODS OF MAKING THE SAME

CROSS REFERENCE TO RELATED APPLICATION:

The application is a continuation patent application of its copending parent patent application, Ser. No. 181,296, filed Apr. 14, 1988, now abandoned.

BACKGROUND OF THE INVENTION

1. Field of the Invention

This invention relates to a new breakaway coupling for incorporation into a conduit system, a conduit system utilizing the breakaway coupling and to new methods of making the same.

2. Prior Art Statement

It is known to provide a breakaway coupling for incorporation into a conduit system and comprising a pair of tubular coupling members each having opposed end means one of which is adapted to be interconnected to a part of the conduit system and the other of which is held in sealing and coupling engagement with the other end means of the other coupling member until uncoupled therefrom by a certain axial force means being created therebetween, each of the coupling members having a fixed valve seat means and a movable valve member for opening and closing its respective valve seat means whereby the valve seat means of the coupling members must both be open before a fluid flow can pass through the coupling members, each of the coupling members having spring means operatively associated with its respective valve member to tend to move that valve member to its closed position, each of the coupling members having abutment means for engaging the valve member of the other coupling member and moving the same to its open position in opposition to its respective spring means as the coupling members are being disposed in their coupling engagement. For example, see the Spinosa et al U.S. Pat. No. 4,506,862; the King et al U.S. Pat. No. 4,614,201 and the Rabushka et al U.S. Pat. No. 4,691,941.

SUMMARY OF THE INVENTION

It is one feature of this invention to provide a new breakaway coupling by utilizing an annular slide valve member arrangement in a unique manner.

In particular, it has been found that a breakaway coupling that utilizes a double poppet valve arrangement to seal during uncoupling thereof has a disadvantage because the coupling tends to be too large and requires auxiliary sealing between the two poppets.

Accordingly, it was found according to the teachings of this invention that by utilizing an annular sleeve valve member in a breakaway coupling, the resulting breakaway coupling allows a smaller part to be utilized to achieve a similar flow area (and still maintain similar pressure drop) and eliminates the need to provide a sealing structure between the two movable valve members thereof.

Also, it is believed that the breakaway coupling of this invention can be of smaller size (and weight), have a reduced number of sealing locations and readily permits the design to be suitable for a coaxial breakaway hose arrangement as will be apparent hereinafter.

In particular, one embodiment of this invention provides a breakaway coupling for incorporation into a conduit system and comprising a pair of tubular coupling members each having opposed end means one of which is adapted to be interconnected to a part of the conduit system and the other of which is held in sealing and coupling engagement with the other end means of the other coupling member until uncoupled therefrom by a certain axial force means being created therebetween, each of the coupling members having a fixed valve seat means and a movable valve member for opening and closing its respective valve seat means whereby the valve seat means of the coupling members must both be open before a fluid flow can pass through the coupling members, each of the coupling members having spring means operatively associated with its respective valve member to tend to move that valve member to its closed position, each of the coupling members having abutment means for engaging the valve member of the other coupling member and moving the same to its open position in opposition to its respective spring means as the coupling members are being disposed in their coupling engagement, the fixed valve seat means of one of the coupling members comprising a cup-shaped member having a closed end interconnected by sidewall means to an open end disposed in fluid communication with the one opposed end means of the one coupling member, the sidewall means having opening means therethrough, said valve member of said one coupling member comprising an annular slide member telescopically receiving the cup-shaped member therein so as to slide on the sidewall means and tend to be urged to a position thereon by its spring means to close the opening means thereof.

Accordingly, it is an object of this invention to provide a new breakaway coupling for incorporation into a conduit system, the coupling of this invention having one or more of the novel features of this invention as set forth above or hereinafter shown or described.

Another object of this invention is to provide a new method of making a breakaway coupling for incorporation into a conduit system, the method of this invention having one or more of the novel features of this invention as set forth above or hereinafter shown or described.

Another object of this invention is to provide a new conduit system having a breakaway coupling therein, the system of this invention having one or more of the novel features of this invention as set forth above or hereinafter shown or described.

Another object of this invention is to provide a new method of making a conduit system having a breakaway coupling incorporated therein, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

DESCRIPTION OF THE PREFERRED EMBODIMENTS

While the various features of this invention are hereinafter illustrated and described as being particularly adapted to provide a breakaway coupling for the flexible hose assembly of a dispensing gasoline pump arrangement, it is to be understood that the various features of this invention can be utilized singly or in various combinations thereof to provide a breakaway arrangement for other conduit systems as desired.

Therefore, this invention is not to be limited to only the embodiment illustrated in the drawings, because the drawings are merely utilized to illustrate one of the wide variety of uses of this invention.

Figure 1:
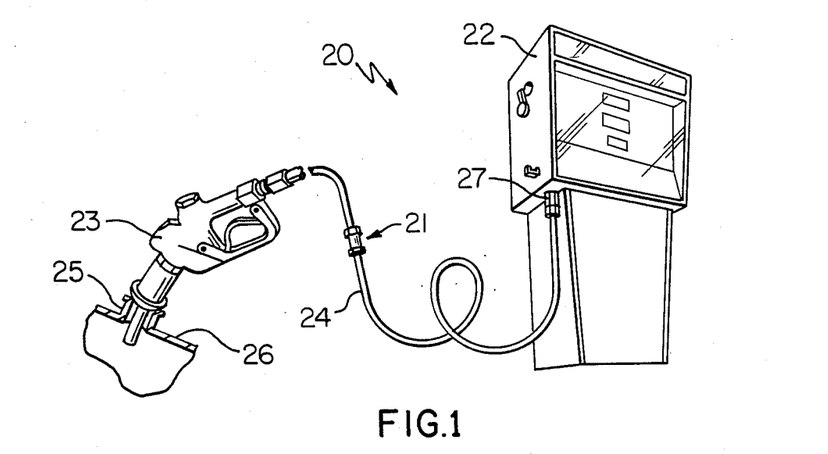
FIG. 1 is a fragmentary perspective view schematically illustrating the new conduit system of this invention.
Figure 2:
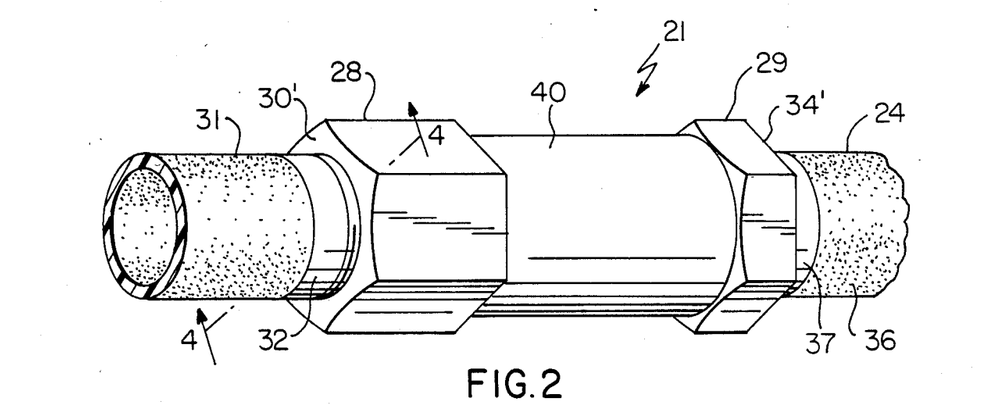
FIG. 2 is an enlarged fragmentary view of the breakaway coupling portion of the system of FIG. 1 and is taken in the direction of the arrows 2—2 of FIG. 1.
Figure 3:
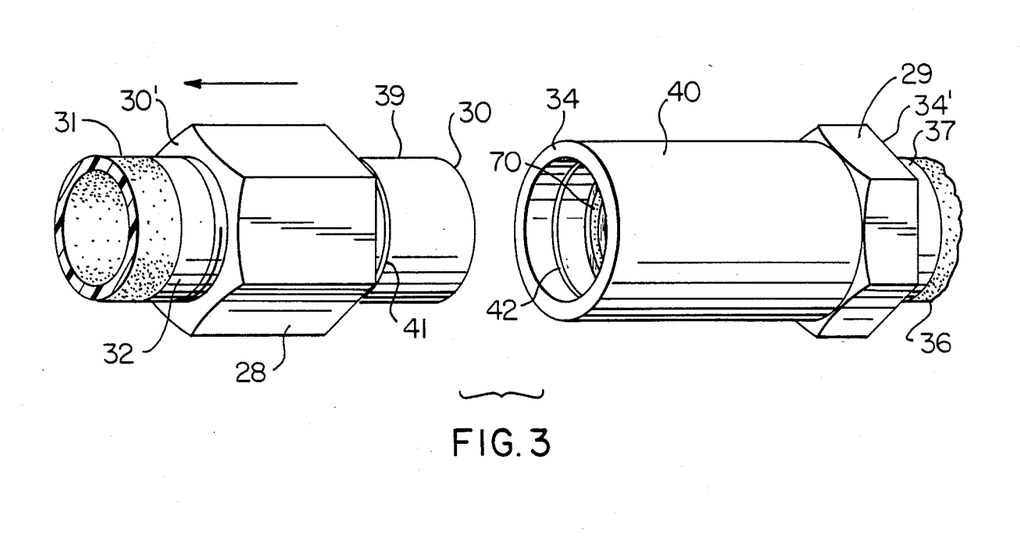
FIG. 3 is a view similar to FIG. 2 and illustrates the breakaway coupling in its uncoupled condition.

Referring now to FIGS. 1–3, the new conduit system of this invention is generally indicated by the reference numeral 20 and comprises a new breakaway coupling of this invention that is generally indicated by the reference numeral 21 incorporated into the system 20, the system 20 illustrated in FIG. 1 further comprising a conventional curbside fuel dispensing pump means 22 interconnected to a dispensing nozzle construction 23 by a flexible hose means 24 that has the breakaway coupling 21 therein so that should the nozzle 23 be left in the filler pipe 25 of the gasoline storage tank 26 of a transportation vehicle (not shown) and have the transportation vehicle drive away, the coupling 21 will have a certain axial force imposed thereon to cause the same to uncouple in the manner illustrated in FIG. 3 and thereby prevent damage to the pump means 22 as is well known in the art as set forth in the aforementioned three U.S. patents, No. 4,506,862—Spinosa et al; No. 4,614,201—King et al and No. 4,691,941—Rabushka et al whereby these three patents are being incorporated into this disclosure by this reference thereto.

Therefore, since the reasons for the use of a breakaway coupling are well known in the art and it is well known that such a breakaway coupling can be disposed anywhere in a conduit system whether the same is in the hose line 24 as illustrated in FIG. 1, adjacent the pump 22 as represented by the reference numeral 27, or within the conduit system of the pump means 22, a further discussion of the same is deemed unnecessary except as hereinafter set forth in order to fully understand the various features of this invention.

As illustrated in FIGS. 1–3, the breakaway coupling 21 of this invention comprises two tubular coupling members 28 and 29, the coupling member 28 having opposed end means 30 and 30' with the end 30' thereof being interconnected to a part 31 of the flexible hose 24 in any suitable manner. For example, the part 31 can have a threaded extension 32 thereon that is adapted to thread in sealing relation into an internally threaded portion 33 of the end means 30' of the coupling member 28. Similarly, the coupling member 29 has opposed end means 34 and 34' with the end means 34' being adapted to be interconnected to another part 36 of the flexible hose means 24 such as by having the part 36 of the hose means 24 provided with an externally threaded extension 37 that is disposed in threaded sealing relation within an internally threaded portion 38 of the coupling member 29.

Figure 4:
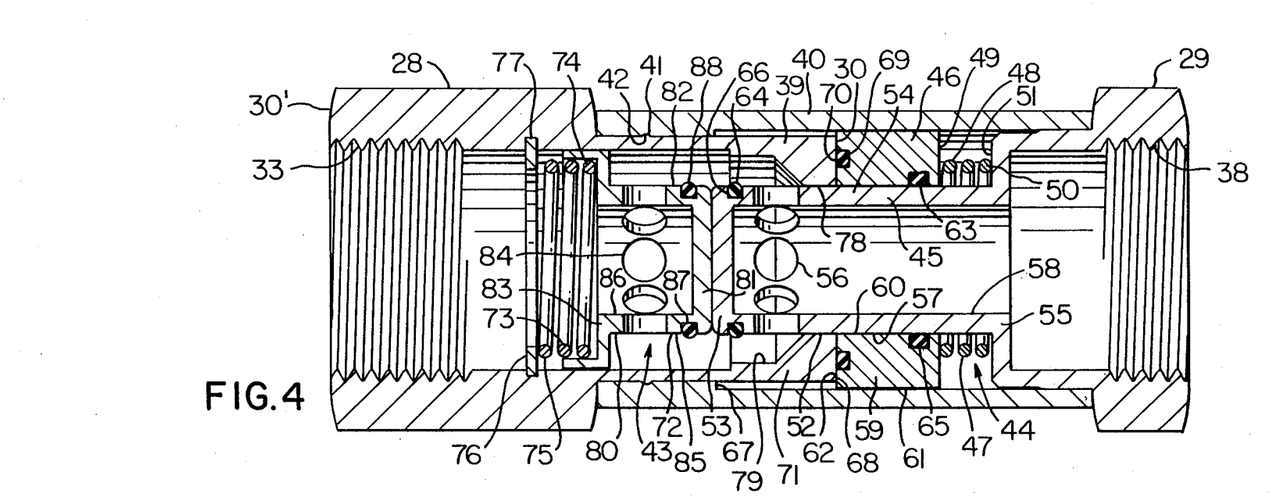
FIG. 4 is an enlarged cross-sectional view taken on line 4—4 of FIG. 2 and illustrates the new breakaway coupling of this invention.

The coupling members 28 and 29 are adapted to have the end means 30 and 34 thereof disposed in a telescoping relation as illustrated in FIGS. 2 and 4 so as to couple the same together, the end means 30 of the coupling member 28 comprising a tubular extension 39 telescopically disposed within a tubular extension 40 that forms the end means 34 of the coupling member 29.

The tubular extension 39 of the coupling member 28 has an outwardly directed annular projection 41 thereof that is adapted to snap-fit into an annular groove 42 formed in the tubular extension 40 of the coupling member 29 as illustrated in FIG. 4 to tend to hold the coupling members 28 and 29 in their coupled engagement. However, when a certain axial force is applied between the coupling members 28 and 29, such as by having a vehicle tend to drive away from the pump means 22 while the nozzle 23 is disposed in the filler pipe 25 thereof as previously set forth, the coupling members 28 and 29 are uncoupled in the manner illustrated in FIG. 5 by permitting the annular projection 41 to be pulled out of the annular groove 42 and thereby permit uncoupling of the members 28 and 29.

The coupling member 28 has a valve means therein that is generally indicated by the reference numeral 43 and the coupling member 29 has a valve means therein that is generally indicated by the reference numeral 44, the valve means 43 and 44 respectively being disposed in an open condition thereof as illustrated in FIG. 4 in a manner hereinafter set forth so as to provide fluid communication through the coupling 21 between the parts 31 and 36 of the hose assembly 24 when the coupling members 28 and 29 are disposed in the coupled engagement thereof as illustrated in FIG. 4. However, the valve means 43 and 44 are adapted to respectively be automatically moved to their closed conditions as illustrated in FIG. 5 in a manner hereinafter set forth so as to prevent any fluid flow out of the ends 30 and 34 thereof from the parts 31 and 36 of the hose assembly 24 when the breakaway coupling 21 is disposed in its uncoupled condition as illustrated in FIG. 5.

While the use of such valve means 43 and 44 for the previously described purpose are well known in the art, one feature of this invention is to provide the valve means 43 and 44 in a unique manner so as to provide the advantages of this invention that were previously set forth.

Figure 5:
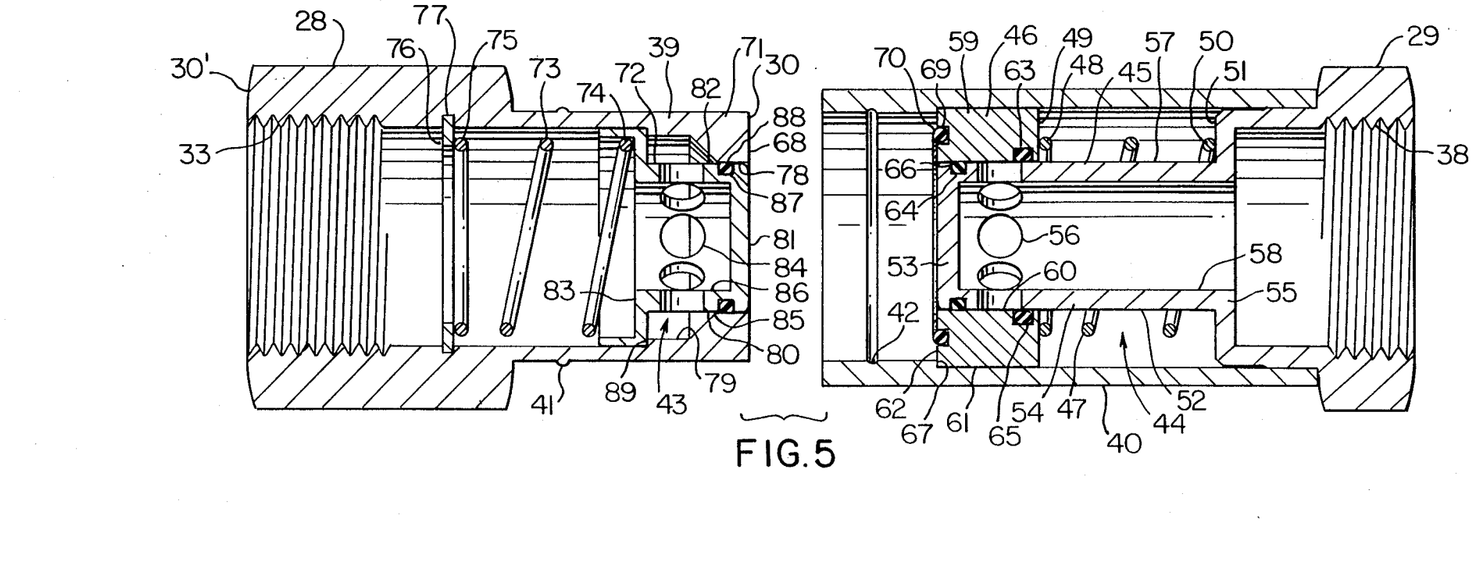
FIG. 5 is a view similar to FIG. 4 and illustrates the coupling members of FIG. 4 in their uncoupled condition.

As illustrated in FIGS. 4 and 5, the valve means 44 for the coupling member 29 comprises a fixed valve seat means 45 and a movable valve member 46 that is urged to its valve seat closing position of FIG. 5 by a compression spring 47 having one end 48 bearing against one end 49 of the valve member 46 and the other end 50 thereof bearing against an annular shoulder 51 of the coupling member 29.

The fixed valve seat means 45 for the coupling member 29 comprises a cup-shaped member 52 having a substantially flat closed end 53 interconnected by a substantially cylindrical sidewall means 54 to an open end 55 thereof that is disposed in fluid communication with the threaded opening 38 at the opposed end means 34' thereof, the cup-shaped member 52 having a plurality of circular opening means 56 passing therethrough in a circular array and leading from the exterior peripheral surface 57 of the sidewall means 54 to the interior peripheral surface 58 thereof.

The movable valve member 46 of the coupling member 29 comprises an annular slide member or sleeve 59 having an internal peripheral surface 60 and an outer peripheral surface 61 as well as opposed ends 49 and 62, the slide member 59 being telescopically disposed on the sidewall means 54 of the cup-shaped member 52 to slide thereon between the fully open position of FIG. 4 which occurs when the coupling members 28 and 29 are fully coupled together in a manner hereinafter set forth and the position where the slide valve member 59 closes the valve seat openings 56 as illustrated in FIG. 5. The slide valve member 59 is adapted to seal closed the openings 56 when disposed in the closed position of FIG. 5 through the cooperation of two annular sealing members 63 and 64 respectively disposed on opposite sides of the openings 56 and respectively being disposed in sealing relation between the slide member 59 and the sidewall means 54 of the cup-shaped member 52.

In particular, the slide member 46 has an annular groove 65 formed in the internal peripheral surface 60 thereof at the end 49 thereof to receive the sealing member 63 which is disposed in compressed sealing relation between the slide member 59 and the external peripheral surface 57 of the sidewall means 54. Conversely, the annular sealing member 64 is received in an annular groove 66 formed in the internal peripheral surface 57 of the sidewall means 54 of the cup-shaped member 52 and is disposed in compressed sealing relation between the sidewall means 54 and the internal peripheral surface 60 of the slide member 59 when the slide member 59 has its end 62 moved over the sealing member 64 in the manner illustrated in FIG. 5.

The tubular extension 40 of the coupling member 29 has an annular stop shoulder 67 extending inwardly therefrom and against which the flat end 62 of the slide member 59 is adapted to abut under the force of the compression spring 47 when the slide member 59 is moved to its fully closed position as illustrated in FIG. 5.

However, when the tubular extension 39 of the coupling member 28 is being telescoped within the tubular extension 40 of the coupling member 29 so as to couple the coupling members 28 and 29 together, a substantially flat end 68 of the extension 39 of the coupling member 28 comprises an abutment means which abuts against the end 62 of the slide member 59 and causes the same to move to the right in FIG. 4 in opposition to the force of the compression spring 47 and thereby move to the fully open position by the time the extensions 39 and 40 are coupled together by the cooperating projection 41 and groove 42 thereof as previously set forth.

In order to fluid seal the end 62 of the slide member 59 and the abutment end 68 of the tubular extension 39 of the coupling member 28 together, an annular groove 69 is formed in the flat end face 62 of the slide member 59 and receives an annular sealing member 70 therein which is adapted to be disposed in compressed sealing relation against the surface 69 of the coupling member 28 when the surfaces 68 and 62 are brought together as illustrated in FIG. 4.

The valve means 43 of the coupling member 28 comprises a fixed valve seat means 71 and a movable valve member 72 that is urged to its closed condition with he valve seat means 71 by a compression spring 73 having one end 74 bearing against the valve member 72 and the other end 75 thereof bearing against a split spring retainer 76 disposed in an annular groove 77 formed in the coupling member 28 as illustrated.

The fixed valve seat means 71 of the coupling member 29 comprises an internal peripheral surface 78 formed in the end 68 of the tubular extension 39 thereof and leads to a stepped opening means 79 that extends to the threaded opening 33 thereof at the end means 30' thereof.

The movable valve member 72 of the coupling member 28 comprises a cup-shaped member 80 that has a substantially flat closed end 81 interconnected by a substantially cylindrical sidewall means 82 to an open end 83 thereof that is disposed in fluid communication with the opening 33 at the end means 30' thereof, the sidewall means 82 of the cup-shaped member 80 having a plurality of opening means 84 passing through the sidewall means 82 in a circular array and extending from the outer peripheral surface 85 thereof to the internal peripheral surface 86 thereof as illustrated.

The cup-shaped valve member 80 of the coupling member 28 has an annular groove 87 formed in the external peripheral surface 85 of the sidewall means 82 thereof and receives an annular sealing member 88 therein that is adapted to be disposed in sealing and compressed relation against the valve seat surface 78 of the fixed valve seat member 71 when the cup-shaped valve member 80 is moved to the closed position as illustrated in FIG. 5, the valve member 72 being held against an annular shoulder means 89 of the tubular extension 39 of the coupling member 28 by the compression spring 73 when valve member 72 is disposed in the fully closed position as illustrated in FIG. 5.

However, when the coupling members 28 and 29 are being coupled together by telescoping the tubular extension 39 of the coupling member 28 within the tubular extension 40 of the coupling member 29 as previously set forth, the end wall 81 of the valve member 72 of the coupling member 28 engages against the fixed abutment means or end wall 53 of the fixed valve seat means 45 of the coupling member 29 so that the valve member 72, in effect, is moved away from the valve seat surface 78 while the spring 73 thereof is being compressed in the manner illustrated in FIG. 4 so that when the tubular extensions 39 and 40 are fully coupled together by the cooperating projection 41 and groove 42 in the manner previously set forth, both valve members 59 and 80 of the valve means 44 and 43 are held in the open condition thereof so that a fluid flow can be provided between the coupling members 28 and 29. For example, there is fluid interconnection between the opening 33 and in the end means 30' of the coupling member 28 and outwardly through the openings 84 in the cup-shaped valve member 72 to the openings 56 in the fixed valve seat means 45 of the coupling member 29 and into the interior of the fixed valve seat means 45 to the opening 38 at the end means 34' of the coupling member 29.

However, when the coupling members 28 and 29 are uncoupled by an axial force being imposed therebetween so that the coupling members 28 and 29 are disposed in the position illustrated in FIG. 5, the compression spring 47 moves the slide valve member 59 to its closed position as illustrated in FIG. 5 to seal closed the openings 56 thereof and the cup-shaped valve member 80 of the coupling member 28 is moved by the compression spring 73 to its closed position whereby both valve means 44 and 43 of the coupling members 29 and 28 are closed so as to prevent any fluid from the parts 31 and 36 of the conduit system 20 from flowing out of the uncoupled coupling members 28 and 29.

Thus, it can be seen that the breakaway coupling 21 of this invention operates in a simple and effective manner to permit fluid flow to pass through the breakaway coupling 21 when the coupling members 28 and 29 are disposed in the coupled condition as illustrated in FIG. 4 and to prevent fluid flow out of the coupling members 28 and 29 when the same are uncoupled in the manner illustrated in FIG. 5.

In particular, when it is desired to couple the members 28 and 29 together, the tubular extension 39 of the coupling member 28 is inserted into the tubular extension 40 of the coupling member 29 and the abutment surface 68 of the extension 39 of the coupling member 28 engages against the slide valve member 59 of the coupling member 29 and moves the same from its closed position to its open position in opposition to the force of the compression spring 47 while the valve member 72 of the coupling member 28 engages against the abutment surface 53 of the coupling member 29 and causes the valve member 72 to be moved away from the fixed valve seat surface 78 in opposition to the force of the compression spring 73 so as to provide fluid communication between the coupling members 28 and 29 through the open opening means 84 and 56 of the cup-shaped members 72 and 52 of the coupling members 28 and 29.

However, when the coupling members 28 and 29 are uncoupled from each other, the compression spring 47 closes the slide member 59 and the compression spring 73 closes the valve member 72 as illustrated in FIG. 5.

While the conduit system 20 previously set forth has the hose means 24 thereof comprising a single hose for delivering fuel from the pump means 22 to the nozzle means 23, it is to be understood that the conduit system of this invention can comprise a coaxial vapor recovery conduit system wherein an inner product hose is utilized to direct fuel from the pump means to the dispensing nozzle while a surrounding hose means creates a vapor recovery passage means between the outer surrounding hose means and the inner product hose means for returning vapors of the dispensed fuel back to the pump means, such coaxial vapor recovery hose arrangement being well known in the art as set forth in the Basham U.S. Pat. No. 3,980,112 and the Furrow et al U.S. Pat. No. 4,687,033 whereby these two patents are being incorporated into this disclosure by this reference thereto.

Figure 6:
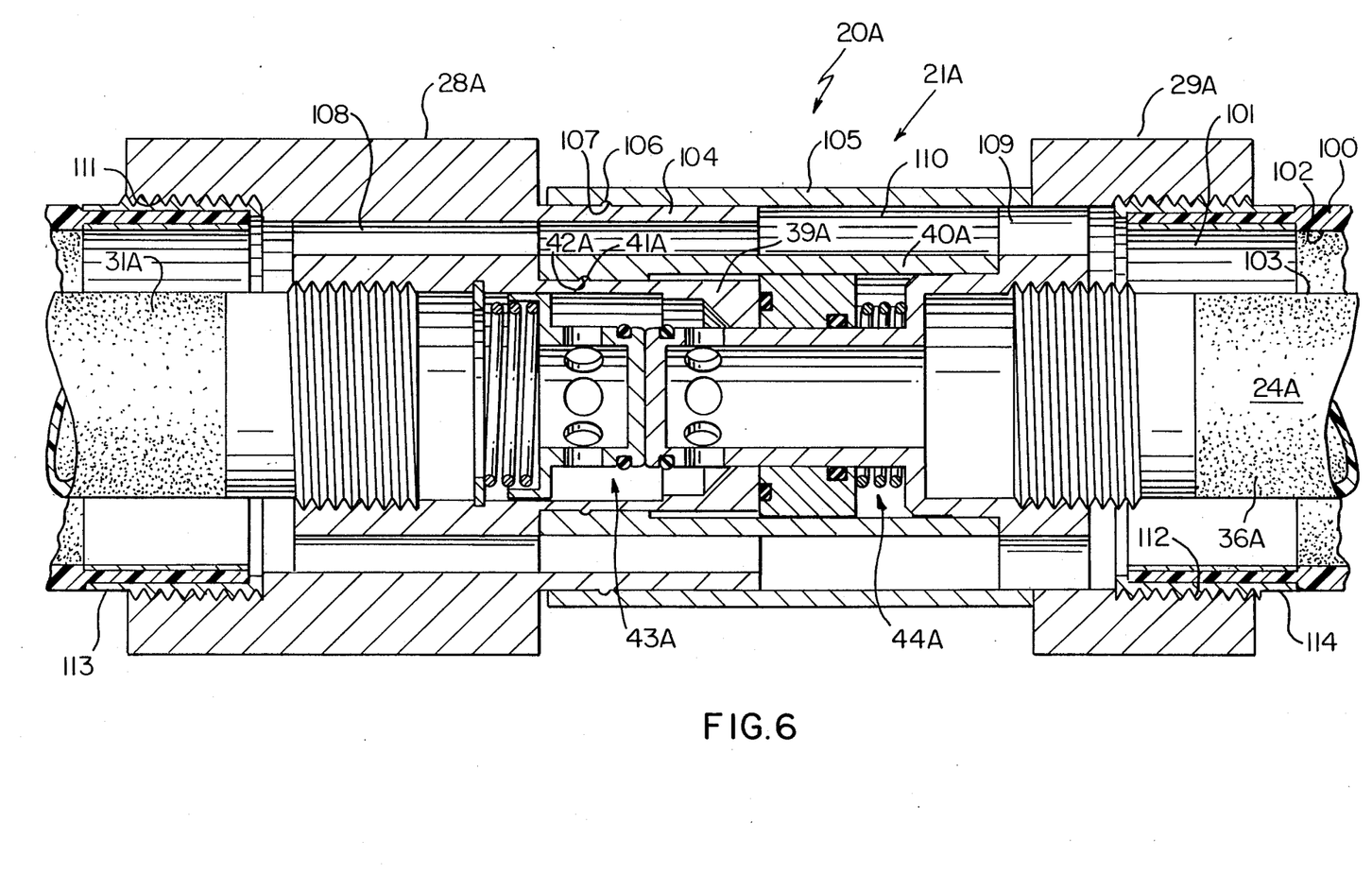
FIG. 6 is a view similar to FIG. 4 and illustrates a breakaway coupling of this invention being utilized in a coaxial conduit system.

For example, reference is now made to FIG. 6 wherein another conduit system of this invention is generally indicated by the reference numeral 20A and parts thereof similar to the conduit system 20 previously described are indicated by like reference numerals followed by the reference letter "A".

As illustrated in FIG. 6, the conduit system 20A comprises an inner product hose means 24A for delivering liquid fuel therethrough from a pump means (not shown) to a dispensing nozzle means (not shown) in substantially the same manner as the hose means 24 of FIG. 1 and an outer hose means 100 receiving the product hose 24A coaxially therein and thereby defining a passage means 101 between the inner peripheral surface means 102 of the outer hose 100 and the outer peripheral surface 103 of the inner product hose 24A for directing vapors of the liquid fuel to a vapor recovery means in a manner well known in the art as set forth in the aforementioned U.S. patents to Basham and Furrow et al.

The conduit system 20A of this invention also includes a breakaway coupling means of this invention that is generally indicated by the reference numeral 21A and comprises two coupling members 28A and 29A that are respectively interconnected to adjacent parts 31A and 36A of the product hose 24A and have the unique valve means 43A and 44A therein for performing the fluid interconnecting path between the parts 31A and 36A when the couplings 28A and 29A are disposed in their coupled engagement as previously set forth and for closing off the parts 31A and 36A of the hose means 24A when the coupling members 28A and 29A are separated by an axial force being imposed upon the conduit system 20A as previously set forth.

In addition, the coupling members 28A and 29A respectively have tubular extensions 104 and 105 respectively spaced outwardly from the tubular extensions 39A and 40A thereof and being adapted to be telescopically disposed and interconnected together by an annular projection 106 on the tubular extension 104 being received in an annular groove 107 in the tubular extension 105 in the same manner that the tubular extensions 39A and 40A are coupled together by the annular projection 41A and annular groove 42A as previously set forth.

The coupling members 28A and 29A respectively have a plurality of passage means 108 and 109 formed therein and interconnecting an annular space 110 located inwardly from the tubular extensions 104 and 105 to threaded opening means 111 and 112 that respectively surround, in spaced relation, the coupled parts 31A and 36A of the inner hose 24A as illustrated. In this manner, the outer hose 100 can have adjacent parts 113 and 114 thereof threadedly interconnected to the openings 111 and 112 of the coupling members 28A and 29A so that the vapor recovery passage 101 is interconnected together between the parts 113 and 114 by the openings 108 and 109 in the coupling members 28A and 29A as well as the annular passage 110 between the interconnected tubular extensions 104 and 105 and the interconnected tubular extensions 39A and 40A.

Therefore, it can be seen that the breakaway coupling 21A of this invention functions in substantially the same manner as the breakaway coupling 21 previously set forth in regard to the valve means 43A and 44A thereof and the tubular extensions 104 and 105 of the coupling members 28A and 29A permit the same to form a continuation of the vapor recovery passage means 101 when the coupling members 28A and 29A are disposed in their coupling engagement as illustrated in FIG. 6.

Therefore, since the operation of the conduit system 20A is substantially the same as the operation of the conduit system 20 previously set forth, a further discussion thereof is deemed unnecessary.

Figure 7:
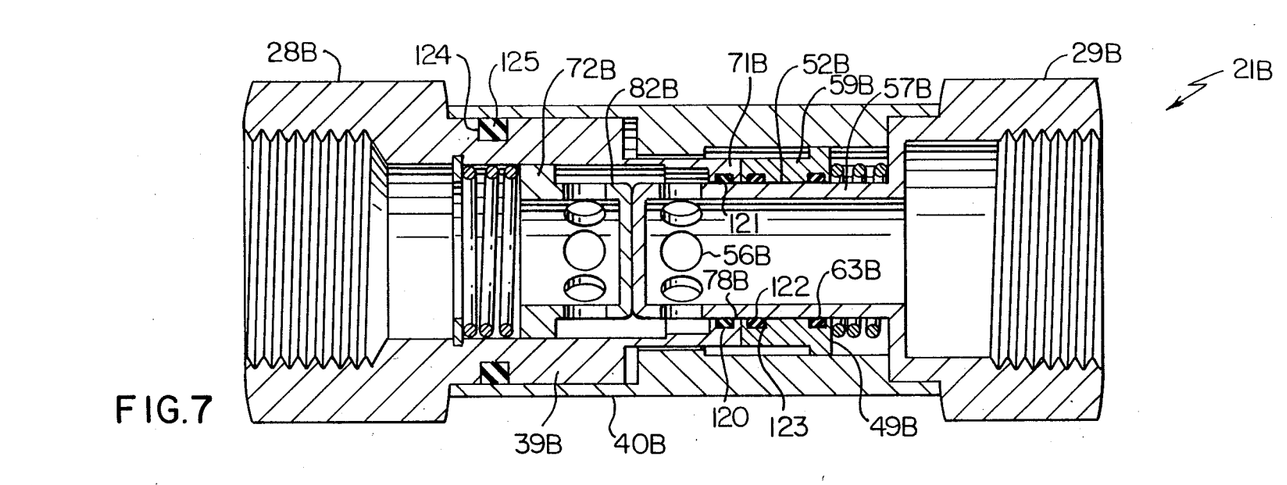
FIG. 7 is a view similar to FIG. 4 and illustrates another breakaway coupling of this invention.
Figure 8:
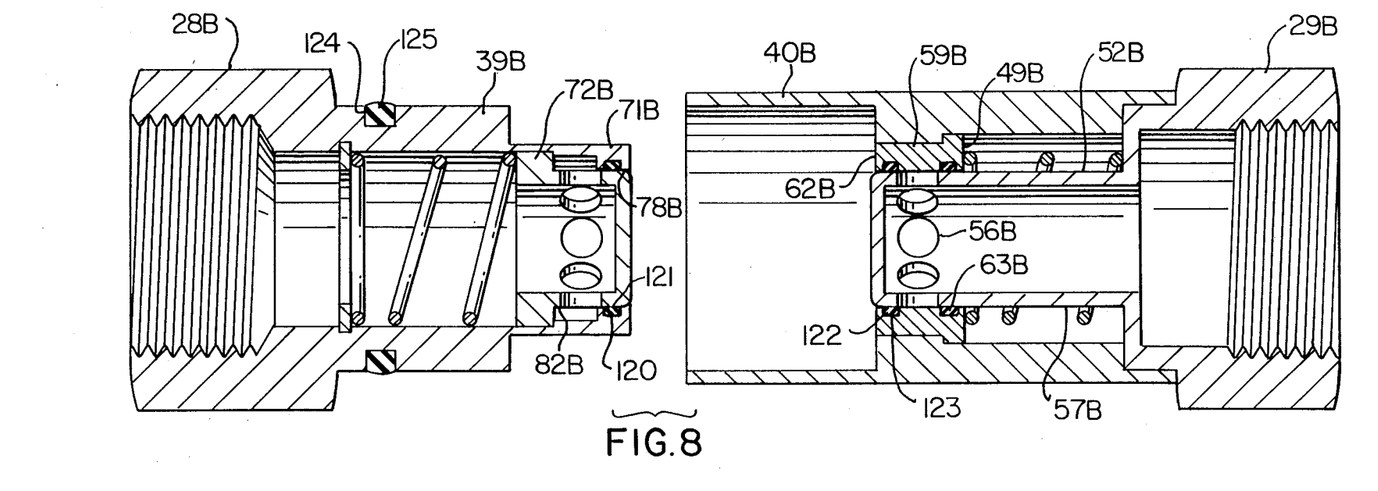
FIG. 8 is a view similar to FIG. 7 and illustrates the coupling members of FIG. 7 in the uncoupled condition thereof.

Another breakaway coupling of this invention is generally indicated by the reference numeral 21B in FIGS. 7 and 8 and parts thereof similar to the breakaway coupling 20 previously set forth are indicated by like reference numerals followed by the reference letter "B".

The breakaway coupling 21B is substantially the same as the breakaway coupling 21 previously described except that the cup-shaped member 52B and cup-shaped valve member 72B do not carry any annular sealing means. Instead, the fixed valve seat surface 78B of the coupling member 28B is interrupted by an annular groove 120 which receives an annular sealing member 121 therein that is adapted to be disposed in compressed sealing engagement between the fixed valve seat means 71B and the sidewall means 82B of the cup-shaped valve member 72B when the valve member 72B is in the closed position as illustrated in FIG. 8.

Similarly, the slide valve member 59B of the coupling member 29B not only carries the annular sealing member 63B at the end 49B thereof, but also the slide valve member 59B carries another annular sealing member 122 in an annular groove 123 at the end 62B thereof so that both sealing means 122 and 63B are disposed in compressed sealing relation against the sidewall means 57B of the cup-shaped member 52B on opposite sides of the openings 56B to seal the same closed when the slide valve member 59B is disposed in the closed condition as illustrated in FIG. 8.

In addition, the tubular extension 39B of the coupling 28B is provided with an annular groove 124 which receives an annular sealing member 125 therein that is adapted to cooperate with the tubular extension 40B of the coupling member 29B to provide for a frictional securement therebetween when the coupling members 28B and 29B are disposed in the coupling engagement illustrated in FIG. 7 so that it requires a certain axial force between the coupling members 28B and 29B to separate the same from the coupled condition in FIG. 7 to the uncoupled condition illustrated in FIG. 8.

Thus, it can be seen that the annular sealing means 121 of the valve seat means 71B performs the same function as the sealing means 88 of the movable valve member 72. Likewise, the sealing member 122 of the slide member 59B performs the same sealing function as the annular sealing member 64 of the fixed valve seat means 52 of the coupling member 29 previously described.

Therefore, since the operation of the breakaway coupling 21B is substantially the same as the operation of the breakaway coupling 21 previously set forth, a further discussion of the operation thereof is deemed unnecessary.

From the above, it can be seen that this invention not only provides new conduit systems and new breakaway couplings therefor, but also this invention provides new methods of making conduit systems and breakaway couplings therefor.

While the forms and methods of this invention now preferred have been illustrated and described as required by the Patent Statute, it is to be understood that other forms and method steps can be utilized and still fall within the scope of the appended claims wherein each claim sets forth what is believed to be known in each claim prior to this invention in the portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the Patent Statute.

What is claimed is:

1. In a breakaway coupling for incorporation into a conduit system and comprising a pair of tubular coupling members each having opposed end means one of which is adapted to be interconnected to a part of said conduit system and the other of which is held in sealing and coupling engagement with the other end means of the other coupling member until uncoupled therefrom by a certain axial force means being created therebetween, each of said coupling members having a fixed valve seat means and a movable valve member for opening and closing its respective said valve seat means whereby said valve seat means of said coupling members must both be open before a fluid flow can pass through said coupling members, each of said coupling members having spring means operatively associated with its respective valve member to tend to move that valve member to its closed position, each of said coupling members having abutment means for engaging said valve member of the other coupling member and moving the same to its open position in opposition to its respective spring means as said coupling members are being disposed in their said coupling engagement, said fixed valve seat means of one of said coupling members comprising a cup-shaped member having a closed end interconnected by sidewall means to an open end disposed in fluid communication with the one opposed end means of said one coupling member, said sidewall means having opening means therethrough, said valve member of said one coupling member comprising an annular slide member telescopically receiving said cup-shaped member therein so as to slide on said sidewall means and tend to be urged to a position thereon by its said spring means to close said opening means, the improvement wherein said annular slide member comprises a one-piece member having a rectangular transverse cross-sectional configuration that defines flat parallel opposed annular end surfaces of said slide member and concentrically disposed inner and outer cylindrical peripheral surfaces of said slide member that extend completely between said flat opposed annular end surfaces and that respectively have circular transverse cross-sectional configurations of the same diameters throughout the entire lengths thereof.

2. A coupling as set forth in claim 1 wherein said slide member has opposed ends, and an annular sealing means being carried by one of said ends of said slide member and being disposed in sealing relation between said one end of said slide member and said sidewall means of said cup-shaped member in all operative positions of said slide member on said sidewall means.

3. A coupling as set forth in claim 2 and comprising a second annular sealing means carried by the other of said ends of said slide member and being disposed in sealing relation between said other end of said slide member and said abutment means of the other of said coupling members when said coupling members are in said coupling engagement thereof.

4. A coupling as set forth in claim 3 and comprising a third annular sealing means carried on said sidewall means of said cup-shaped member on one side of said opening means and being adapted to be disposed in sealing relation between said sidewall means and said other end of said slide member when said slide member is in its closed position.

5. A coupling as set forth in claim 4 wherein said sealing member carried by said one end of said slide member is always disposed on the other side of said opening means of said cup-shaped member in all operating positions of said slide member whereby said opening means is sealed closed by said slide member being in said closed position thereof.

6. A coupling as set forth in claim 5 wherein said one coupling member has stop means, said slide member being urged against said stop means by said spring means thereof when said slide member is in said closed position thereof.

7. A coupling as set forth in claim 1 wherein said closed end of said cup-shaped member of said one coupling member comprises said abutment means thereof.

8. A coupling as set forth in claim 1 wherein said valve member of the other of said coupling members comprises a cup-shaped member having a closed end interconnected by sidewall means to an open end that is disposed in fluid communication with the one opposed end means of said other coupling member, said sidewall means of said cup-shaped member of said other coupling member having opening means therethrough.

9. A coupling as set forth in claim 8 and comprising an annular sealing means carried on said sidewall means of said cup-shaped valve member of said other coupling member for being disposed in sealing relation with said fixed valve seat means of said other coupling member when said valve member of said other coupling member is in the closed position thereof.

10. In a conduit system having a breakaway coupling incorporated therein and comprising a pair of tubular coupling members each having opposed end means one of which is interconnected to a part of said conduit system and the other of which is held in sealing and coupling engagement with the other end means of the other coupling member until uncoupled therefrom by a certain axial force means being created therebetween, each of said coupling members having a fixed valve seat means and a movable valve member for opening and closing its respective said valve seat means whereby said valve seat means of said coupling members must both be open before a fluid flow can pass through said coupling members, each of said coupling members having spring means operatively associated with its respective valve member to tend to move that valve member to its closed position, each of said coupling members having abutment means for engaging said valve member of the other coupling member and moving the same to its open position in opposition to its respective spring means as said coupling members are being disposed in their said coupling engagement, said fixed valve seat means of one of said coupling members comprising a cup-shaped member having a closed end interconnected by sidewall means to an open end disposed in fluid communication with the one opposed end means of said one coupling member, said sidewall means having opening means therethrough, said valve member of said one coupling member comprising an annular slide member telescopically receiving said cup-shaped member therein so as to slide on said sidewall means and tend to be urged to a position thereon by its said spring means to close said opening means, the improvement wherein said annular slide member comprises a one-piece member having a rectangular transverse cross-sectional configuration that defines flat parallel opposed annular end surfaces of said slide member and concentrically disposed inner and outer cylindrical peripheral surfaces of said slide member that extend completely between said flat opposed annular end surfaces and that respectively have circular transverse cross-sectional configurations of the same diameters throughout the entire lengths thereof.

11. A conduit system as set forth in claim 10 wherein said slide member has opposed ends, and an annular sealing means being carried by one of said ends of said slide member and being disposed in sealing relation between said one end of said slide member and said sidewall means of said cup-shaped member in all operative positions of said slide member on said sidewall means.

12. A conduit system as set forth in claim 11 and comprising a second annular sealing means carried by the other of said ends of said slide member and being disposed in sealing relation between said other end of said slide member and said abutment means of the other of said coupling members when said coupling members are in said coupling engagement thereof.

13. A conduit system as set forth in claim 12 and comprising a third annular sealing means carried on said sidewall means of said cup-shaped member on one side of said opening means and being adapted to be disposed in sealing relation between said sidewall means and said other end of said slide member when said slide member is in its closed position.

14. A conduit system as set forth in claim 13 wherein said sealing member carried by said one end of said slide member is always disposed on the other side of said opening means of said cup-shaped member in all operating positions of said slide members whereby said opening means is sealed closed by said slide member being in said closed position thereof.

15. A conduit system as set forth in claim 14 wherein said one coupling member has stop means, said slide member being urged against said stop means by said spring means thereof when said slide member is in said closed position thereof.

16. A conduit system as set forth in claim 15 wherein said closed end of said cup-shaped member of said one coupling member comprises said abutment means thereof.

17. A conduit system as set forth in claim 16 wherein said valve member of the other of said coupling members comprises a cup-shaped member having a closed end interconnected by sidewall means to an open end that is disposed in fluid communication with the one opposed end means of said other coupling member, said cup-shaped member of said other coupling member having opening means therethrough.

18. A conduit system as set forth in claim 17 and comprising an annular sealing means carried on said sidewall means of said cup-shaped valve member of said other coupling member for being disposed in sealing relation with said fixed valve seat means of said other coupling member when said valve member of said other coupling member is in the closed position thereof.

19. A conduit system as set forth in claim 10 wherein said conduit system comprises a flexible hose means for dispensing liquid fuel.

20. A conduit system as set forth in claim 10 wherein said conduit system comprises part of a liquid fuel dispensing system.

* * * * *